United States Patent [19]

Tsukamoto et al.

[11] Patent Number: 4,835,041

[45] Date of Patent: May 30, 1989

[54] BIAXIALLY STRETCHED COMPOSITE STYRENE RESIN SHEET

[75] Inventors: Yukihide Tsukamoto, Ichihara; Yasuhiro Sato, Kamagaya; Minoru Seino, Yotsukaido; Akio Toyoda, Ichihara, all of Japan

[73] Assignee: Dainippon Ink & Chemicals, Inc., Tokyo, Japan

[21] Appl. No.: 67,727

[22] Filed: Jun. 23, 1987

[30] Foreign Application Priority Data

Jun. 23, 1986 [JP] Japan ............................ 61-146514
Oct. 30, 1986 [JP] Japan ............................ 61-257050
Oct. 31, 1986 [JP] Japan ............................ 61-260455

[51] Int. Cl.$^4$ ............................................. B32B 27/30
[52] U.S. Cl. ................................. 428/215; 428/519; 428/910; 264/176.1
[58] Field of Search ...................... 428/215, 519, 910

[56] References Cited

U.S. PATENT DOCUMENTS

| | | | |
|---|---|---|---|
| 4,111,349 | 9/1978 | Buckler et al. | 428/308 X |
| 4,302,554 | 11/1981 | Nabeta et al. | |
| 4,338,378 | 7/1982 | Nabeta et al. | |
| 4,528,221 | 7/1985 | Komatsuzaki et al. | |

FOREIGN PATENT DOCUMENTS

| | | | |
|---|---|---|---|
| 0038254 | 4/1981 | Japan | 428/519 |
| 1442277 | 7/1976 | United Kingdom | |

OTHER PUBLICATIONS

European Search Report dated Sep. 13, 1988.
Abstract, 14373 D/09, Asahi Dowkk, 6/1979 J55163-164.

*Primary Examiner*—P. C. Ives
*Attorney, Agent, or Firm*—Sherman and Shalloway

[57] ABSTRACT

A biaxially stretched composite styrene resin sheet of a multilayer structure, comprising at least one layer of polystyrene and at least two layers of a mixture of polystyrene and styrene/butadiene block copolymer resin, wherein both outside layers are formed of said mixture, the thickness of each of the outside layers is 1 to 20% of the total thickness of the sheet, and the entire sheet is biaxially stretched.

9 Claims, No Drawings

BIAXIALLY STRETCHED COMPOSITE STYRENE RESIN SHEET

This invention relates to a biaxially stretched composite styrene resin sheet having enhanced tear strength and excellent transparency and being substantially free from the occurrence of cracks or cutting chips during trimming.

Biaxially stretched styrene resin sheets have frequently been used in light-weight containers for holding foods because they do not contain substances toxic to humans and have excellent stiffness and moldability. On the other hand, since they are brittle and have low tear strength, they have the defect that when they are trimmed after molding by pressure forming, vacuum forming, etc., cracks and cutting chips occur. In order to remove this defect, a biaxially stretched sheet from a styrene resin softened by addition of high impact polystyrene or a styrene/butadiene block copolymer and having increased tear strength is used. The amount of the high impact polystyrene or styrene/butadiene block copolymer resin, however, is limited because the final sheet will have reduced stiffness and transparency and an increased price. Consequently, the improvement of its strength, particularly tear strength, is not sufficient. Thus, even if the speed of producing molded products from the above sheet by a pressure forming machine or a vacuum forming machine is increased, the number of molded products trimmed cannot be increased. Furthermore, since inspection of cracked products is time-consuming, the molded products are left as a tall pile.

It is an object of this invention to overcome the above defect of the prior art by providing a biaxially stretched styrene resin sheet which has high tear strength, excellent trimmability and good transparency while retaining its inherent high stiffness and which permits re-use of skeletons (wastes occurring at the time of punching molded products out of the sheet).

According to this invention, the above object is achieved by a biaxially stretched composite styrene resin sheet of a multilayer structure, comprising at least one layer of polystyrene and at least two layers of a mixture of polystyrene and styrene/butadiene block copolymer resin, wherein both outside layers are formed of said mixture, the thickness of each of the outside layers is 1 to 20% of the total thickness of the sheet, and the entire sheet is biaxially stretched.

The biaxially stretched composite styrene resin sheet in accordance with this invention may be comprised of a central layer of polystyrene and layers of a mixture of polystyrene and styrene/butadiene block copolymer resin formed on both surfaces of the central layer, and optionally at least one layer of polystyrene and at least one layer of the styrene resin mixture formed successively on both outside layers. Alternatively, it may be comprised of a central layer of the styrene resin mixture, layers of polystyrene formed on both surfaces of the central layer, and layers of the styrene resin mixture formed outwardly of the polystyrene layers, and as required, at least one layer of polystyrene and at least one layer of the styrene resin mixture formed successively on both outside layers.

The biaxially stretched composite styrene resin sheet in accordance with this invention includes the following embodiments.

(1) A biaxially stretched three-layer sheet comprising a central layer of polystyrene and outside layers of the styrene resin mixture formed on both surfaces of the central layer.

(2) A biaxially stretched five-layer sheet comprising a central layer of the styrene resin mixture, intermediate layers of polystyrene formed on both surfaces of the central layer, and outside layers of the styrene resin mixture formed outwardly of the intermediate layers.

(3) A biaxially stretched seven-layer sheet comprising a central layer of polystyrene, first intermediate layers of the styrene resin mixture formed on both surfaces of the central layer, second intermediate layers of polystyrene formed outwardly of the first intermediate layers, and outside layers of the styrene resin mixture formed outwardly of the second intermediate layers.

Polystyrene used in this invention preferably has a weight average molecular weight of 100,000 to 600,000.

The styrene/butadiene block copolymer resin as used in this invention denotes a block copolymer resin composed of units of chains of styrene and units of chains of butadiene. Preferably, it is composed of 20 to 90% by weight of the styrene units and 80 to 10% by weight of the butadiene units and has a melt flow index (JIS K-6870) of 3 to 12g/10 min.

The mixing ratio of polystyrene to the styrene/butadiene block copolymer resin is desirably from 95:5 to 20:80. If the proportion of the styrene/butadiene block copolymer resin is lower than the above-specified limit, the final sheet has low tear strength. If the proportion of the styrene/butadiene block copolymer resin is higher than the above-specified limit, the sheet has a low tensile modulus and lacks high stiffness inherent to a styrene resin. Furthermore, when the biaxially stretched composite styrene resin sheet is wound in roll form, it sticks to itself (blocking phenomenon), and is whitened or broken undesirably.

The thickness of the layer formed of the styrene resin mixture is desirably adjusted to the range of 1 to 20% of the total thickness of the biaxially stretched composite styrene resin sheet. When the thickness is below the lower limit, the sheet has low tear strength. If it exceeds the above-specified upper limit, the sheet has a low tensile modulus and inferior rigidity. Preferably, the thicknesses of layers formed of the styrene resin mixture in the sheet are equal to each other.

The biaxially stretched composite styrene resin sheet of this invention may be prepared, for example, by (1) preparing a multilayer sheet by co-extrusion and biaxially stretching it, (2) forming sheets by melt-extrusion, bonding these sheets while they are still at a high temperature to form a multilayer sheet, and then biaxially stretching the multilayer sheet, or (3) separately preparing sheets, bonding these sheets to each other with an adhesive, and biaxially stretching the resulting multilayer sheet.

Biaxial stretching is preferably carried out by a generally known tenter method or an inflation method at a stretch ratio of from 2 to 4. Preferably, the total thickness of the biaxially stretched composite styrene resin sheet is 0.1 to 1.0 mm.

Preferably, the resin sheet in accordance with this invention is biaxially stretched such that its orientation relaxation stress measured in accordance with ASTM D-1504 is 3 to 15 kg/cm$^2$, preferably 4 to 10 kg/cm$^2$. If its orientation relaxation stress excess the above-specified upper limit, the sheet cannot be molded into products conforming to a mold. If the sheet has an orientation relaxation stress below the above-specified lower limit, cracking occurs undesirably at the time of trimming.

Since the biaxially stretched composite styrene resin sheet of this invention has the following characteristics, it is useful for producing light-weight containers for holding foods and thus has very high industrial utility.

(1) It has higher tear strength (namely, tougher) and higher tensile modulus (higher in stiffness and a molded product from it is less susceptible to deformation) than a biaxially stretched sheet from a polymer blend containing equal amounts of polystyrene and styrene/butadiene block copolymer.

(2) It has good transparency and when, for example, it is molded into a container, it permits easy visual observation of a food held therein.

(3) When skeletons remaining after trimming are added to polystyrene for forming a polystyrene layer, the transparency of a sheet prepared by using such a material is not reduced because the skeletons are well compatible with polystyrene. Thus, the skeletons can be recovered for re-use.

The following Examples illustrate the present invention in greater detail.

EXAMPLES 1-3

Polystyrene (DIC STYRENE CR-5600, a tradename for a product of Dainippon Ink and Chemicals, Inc.) and styrene/butadiene block copolymer resin (K RESIN KR-05, a tradename for a product of Phillips Petroleum International) were mixed by a tumbler in a weight ratio of 60:40 (Example 1), 40:60 (Example 2) and 20:80 (Example 3). The mixture was kneaded in an extruder equipped with a full-flight type screw having a diameter of 50 mm and formed into unstretched mixed sheets having a thickness of 0.1 mm. Thereafter, polystyrene (DIC STYRENE CR-5600, tradename) was melt-extruded from an extruder to form an unstretched sheet. While the sheets are at a high temperature, the unstretched mixed sheets were bonded to both surfaces of the unstretched sheet under 3 kg/cm² to form a multilayer sheet. The thickness of the polystyrene sheet as a central layer was adjusted to 0.8 mm, and the entire thickness of the multilayer sheet, to 1.0 mm.

The multilayer sheet was stretched at 130° C. successively in the longitudinal direction (i.e., machine direction, MD) and the cross direction (CD) at a stretch ratio of 3 by a biaxial stretching device to obtain a biaxially stretched composite styrene resin sheet having a thickness of 110 microns. The thickness of each of the outside layers of the stretched sheet was 11 microns, and the thickness of its central layer was 88 microns.

The tear strength of each of the three biaxially stretched composite styrene resin sheets (of Examples 1, 2 and 3) was measured by a tensile tester ("Tensilon UTM-4-1000" made by Toyo Baldwin) at a pulling speed of 200 mm/min in accordance with JIS K6772. The tensile modulus of the sheet was also measured at a pulling speed of 10 mm/min. in accordance with JIS K6872.

The results are shown in Table 1.

TABLE 1

| Example | Direction | Tear strength (g) | Tensile modulus ($\times 10^4$ kg/cm²) |
|---|---|---|---|
| 1 | MD | 24.0 | 2.60 |
|  | CD | 28.0 | 2.58 |
| 2 | MD | 27.5 | 2.58 |
|  | CD | 30.7 | 2.55 |
| 3 | MD | 38.0 | 2.50 |

TABLE 1-continued

| Example | Direction | Tear strength (g) | Tensile modulus ($\times 10^4$ kg/cm²) |
|---|---|---|---|
|  | CD | 43.5 | 2.48 |

It is seen from Table 1 that the biaxially stretched composite styrene resin sheets of this invention have good tear strengths and tensile moduli.

COMPARATIVE EXAMPLES 1-3

Polystyrene (DIC STYRENE CR-5600) and styrene/butadiene block copolymer resin (K RESIN KR-05) were mixed in a weight ratio of 92:8 (Comparative Example 1), 88:12 (Comparative Example 2) and 84:16 (Comparative Example 3). The mixture was formed into an unstretched mixed sheet having a thickness of 1.0 mm by an extruder. The mixed sheet was stretched at 130° C. in the machine and cross directions at a stretch ratio of 3 by a biaxial stretching device to obtain a biaxially stretched polymer blend sheet containing the styrene/butadiene block copolymer resin in the same amount as in each of the biaxially stretched composite styrene resin sheets of Examples 1 to 3.

The tear strengths and tensile moduli of the biaxially stretched polymer blend sheets of Comparative Examples 1 to 3 were measured, and the results are shown in Table 2.

TABLE 2

| Comparative Example | Direction | Tear strength (g) | Tensile modulus ($\times 10^4$ kg/cm²) |
|---|---|---|---|
| 1 | MD | 8.8 | 2.58 |
|  | CD | 15.3 | 2.55 |
| 2 | MD | 7.3 | 2.54 |
|  | CD | 17.0 | 2.51 |
| 3 | MD | 7.0 | 2.41 |
|  | CD | 15.3 | 2.39 |

Tables 1 and 2 demonstrate that when the sheets containing the same amount of the styrene/butadiene block copolymer are compared, the biaxially stretched composite styrene resin sheets of Examples have much higher tear strength than the biaxially stretched polymer blend sheets of Comparative Examples, and have high tensile molduli and high stiffness.

It is also seen from Tables 1 and 2 that the increase of the amount of the styrene/butadiene block copolymer resin can greatly improve tear strength in the biaxially stretched composite styrene resin sheet in Examples, but cannot at all lead to the improvement of tear strength in the biaxially stretched polymer blend sheets of Comparative Examples.

EXAMPLES 4-6

Forty parts by weight of polystyrene (DIC STYRENE CR-5600) and 60 parts by weight of styrene/butadiene block copolymer resin (K RESINS KR-05) were mixed by a tumbler and formed into unstretched mixed sheets having a thickness of 50 microns (Example 4), 150 microns (Example 5) and 200 microns (Example 6). Then, polystyrene (DIC K STYRENE CR-5600) was melt-extruded from an extruder to form an unstretched sheet, and while the sheets were at a high temperature, the unstretched mixed sheets were bonded to both surfaces of the unstretched polystyrene sheet to a multilayer sheet in which the central layer had a thickness of 900 microns (Example 4), 700 microns (Example 5) and 600 microns (Example 6) and the thickness of each of the outside layers was 50 microns (Example 4), 150 microns (Example 5), and 200 microns (Example 6). The multilayer sheet was stretched at 130° C. both in the machine and cross directions at a stretch ratio of 3 to form a biaxially stretched composite styrene resin sheet. The tear strengths and tensile moduli of the resulting biaxially stretched composite styrene resin sheets in Examples 4 to 6 were measured, and the results are shown in Table 3.

TABLE 3

| Example | Direction | Tear strength (g) | Tensile modulus ($\times 10^4$ kg/cm$^2$) |
| --- | --- | --- | --- |
| 4 | MD | 24.0 | 2.63 |
|   | CD | 26.5 | 2.62 |
| 5 | MD | 32.8 | 2.42 |
|   | CD | 42.5 | 2.40 |
| 6 | MD | 44.5 | 2.32 |
|   | CD | 49.8 | 2.29 |

COMPARATIVE EXAMPLES 4-6

Polystyrene (DIC STYRENE CR-5600) and styrene/butadiene block copolymer resin (K RESIN KR-05) were mixed in a weight ratio of 94:6 (Comparative Example 4), 82:18 (Comparative Example 5) and 76:24 (Comparative Example 6). The mixture was formed into an unstretched mixed sheet having a thickness of 1.0 mm by an extruder. The mixed sheet was stretched at 130° C. in the machine and cross directions at a stretch ratio of 3 by a biaxial stretching device to obtain a biaxially stretched polymer blend sheet containing the styrene/butadiene block copolymer resin in the same amount as in each of the biaxially stretched composite styrene resin sheets of Examples 4 to 6.

The tear strengths and tensile moduli of the biaxially stretched polymer blend sheets of Comparative Examples 4 to 6 were measured, and the results are shown in Table 4.

TABLE 4

| Comparative Example | Direction | Tear strength (g) | Tensile modulus ($\times 10^4$ kg/cm$^2$) |
| --- | --- | --- | --- |
| 4 | MD | 10.2 | 2.62 |
|   | CD | 15.1 | 2.59 |
| 5 | MD | 8.3 | 2.35 |
|   | CD | 77.3 | 2.33 |
| 6 | MD | 11.2 | 2.24 |
|   | CD | 21.6 | 2.21 |

EXAMPLE 7 AND COMPARATIVE EXAMPLE 7

Polystyrene (DIC STYRENE CR-5600) and styrene/butadiene block copolymer resin (K RESIN KR-05) were mixed in a weight ratio of 50:50, and the mixture was extruded by an extruder to form unstretched mixed sheets having a thickness of 70 microns and 140 microns. Thereafter, polystyrene (DIC STYRENE CR-5600) was melt-extruded from an extruder to form an unstretched polystyrene sheet. While the sheets were at a high temperature, the unstretched mixed sheets having a thickness of 70 microns were bonded to both surface of the unstretched polystyrene sheet to form a three-layer sheet (Example 7). In the same way as above, the unstretched mixed sheet having a thickness of 140 microns was bonded to one surface of the unstreched polystyrene sheet at a high temperature to form a two-layer sheet (Comparative Example 7). In these sheets, the polystyrene layer had a thickness of 860 microns, and the total thickness of the sheet was 1.0 mm.

Each of the resulting multilayer sheets was stretched at 130° C. in the machine and cross directions at a stretch ratio of 3 by using a biaxial stretching device to form a biaxially stretched three-layer styrene resin sheet having a thickness of 110 microns (Example 7) or a biaxially stretched two-layer resin sheet having a thickness of 110 microns (Comparative Example 7).

The tear strengths of the two sheets were measured and the number of bendings until one side of the sheet cracked were measured in accordance with JIS K6772.

The results are shown in Table 5.

TABLE 5

| Sample | Direction | Tear strength (g) | Number of bendings until cracking |
| --- | --- | --- | --- |
| Example 7 | MD | 24.1 | 15 |
|   | CD | 27.3 | 13 |
| Comparative Example 7 | MD | 20.1 | 3 |
|   | CD | 23.2 | 3 |

The number bendings until cracking on the biaxially stretched composite styrene resin sheet of Comparative Example 7 differed depending upon the direction of the polystyrene layer during bendings. The value shown in Table 5 in each case is an average of the number of bendings obtained when it was bent with the polystyrene layer facing outwardly and that obtained when it was bent with the polystyrene layer facing inwardly.

It is seen from Table 5 that when the styrene resin mixture layers are formed on both surfaces of the polystyrene layer, the number of bendings until cracking is much larger than that when the styrene resin mixture layer is formed only on one surface of the polystyrene layer.

EXAMPLES 8-10

Polystyrene (DIC STYRENE CR-5600) and styrene/butadiene block copolymer (K RESIN KR-05) were mixed by a tumbler in a weight ratio of 80:20 (Example 8), 40:60 (Example 9) and 20:80 (Example 10). Using the resulting mixtures and polystyrene (DIC STYRENE CR-5600), unstretched co-extruded multilayer sheets each composed of a styrene resin mixture layer (0.067 mm)/a polystyrene layer (0.4 mm)/a styrene resin mixture layer (0.067 mm)/a polystyrene layer (0.4 mm)/a styrene mixture layer (0.067 mm) were formed by means of two extruders equipped with a full-flight type screw, a feed block and a coat hanger die.

Each of the unstretched co-extruded multilayer sheets were successively stretched at 130° C. in the machine and cross directions at a stretch ratio of 3 by means of a biaxially stretched device to give a biaxially stretched composite styrene resin sheet having a thickness of 110 microns. The outside layers and the central layers each had a thickness of 7 microns, and the intermediate layers each had a thickness of 44 microns.

The tear strengths and tensile moduli of the three biaxially stretched composite styrene resin sheets obtained in Examples 8 to 10 were measured, and the results are shown in Table 6.

TABLE 6

| Example | Direction | Tear strength (g) | Tensile modulus ($\times 10^4$ kg/cm$^2$) |
|---|---|---|---|
| 8 | MD | 34.0 | 2.66 |
|   | CD | 37.0 | 2.65 |
| 9 | MD | 39.0 | 2.57 |
|   | CD | 49.0 | 2.56 |
| 10 | MD | 52.0 | 2.51 |
|   | CD | 55.0 | 2.49 |

COMPARATIVE EXAMPLES 8–10

Polystyrene (DIC STYRENE CR-5600) and styrene/butadiene block copolymer resin (K RESIN KR-05) were mixed in a weight ratio of 94:6 (Comparative Example 8), 88:12 (Comparative Example 9) and 84:16 (Comparative Example 10). The mixture was formed into an unstretched mixed sheet having a thickness of 1.0 mm by an extruder. The mixed sheet was stretched at 130° C. in the machine and cross directions at a stretch ratio of 3 by a biaxial stretching device to obtain a biaxially stretched polymer blend sheet containing the styrene/butadiene block copolymer resin in the same amount as in each of the biaxially stretched composite styrene resin sheets of Examples 8 to 10.

The tear strengths and tensile moduli of the biaxially stretched polymer blend sheets of Comparative Examples 9 to 10 were measured, and the results are shown in Table 7.

TABLE 7

| Comparative Example | Direction | Tear strength (g) | Tensile modulus ($\times 10^4$ kg/cm$^2$) |
|---|---|---|---|
| 8 | MD | 12.0 | 2.65 |
|   | CD | 15.0 | 2.63 |
| 9 | MD | 7.3 | 2.54 |
|   | CD | 17.0 | 2.51 |
| 10 | MD | 7.0 | 2.41 |
|   | CD | 15.3 | 2.39 |

EXAMPLES 11–13

Forty parts by weight of polystyrene (DIC STYRENE CR-5600) and 60 parts by weight of styrene/butadiene block copolymer (K RESIN KR-05) were mixed by a tumbler. Using the resulting mixture and polystyrene (DIC STYRENE CR-5600), an unstretched co-extruded multilayer sheet composed of a styrene resin mixture layer (33 microns)/a polystyrene layer (450 microns)/a styrene resin mixture layer (33 microns)/a polystyrene layer (450 microns)/a styrene resin mixture layer (33 microns) (Example 11), an unstretched co-extruded multilayer sheet composed of a styrene resin mixture layer (100 microns)/a polystyrene layer (350 microns)/a styrene resin mixture layer (100 microns)/a polystyrene layer (350 microns)/a styrene resin mixture layer (100 microns) (Example 12), and an unstretched co-extruded multilayer sheet composed of a styrene resin mixture layer (133 microns)/a polystyrene layer (300 microns)/a styrene resin mixture layer (133 microns)/a polystyrene layer (300 microns)/a styrene resin mixture layer (133 microns) (Example 13) were each prepared by using two extruders equipped with a full-flight type screw, a feed block and a coat hanger die.

Each of the unstretched co-extruded multilayer sheets was stretched at 130° C in the machine and cross directions at a stretch ratio of 3 to obtain a biaxially stretched composite styrene resin sheet. The tear strengths and tensile moduli of the resulting biaxially stretched composite styrene resin sheets in Examples 11 to 13 were measured, and the results are shown in Table 8.

TABLE 8

| Example | Direction | Tear strength (g) | Tensile modulus ($\times 10^4$ kg/cm$^2$) |
|---|---|---|---|
| 11 | MD | 36.0 | 2.65 |
|    | CD | 40.0 | 2.64 |
| 12 | MD | 44.0 | 2.44 |
|    | CD | 53.3 | 2.41 |
| 13 | MD | 48.5 | 2.34 |
|    | CD | 58.0 | 2.31 |

COMPARATIVE EXAMPLES 11–13

Polystyrene (DIC STYRENE CR-5600) and styrene/butadiene block copolymer resin (K RESIN KR-05) were mixed in a weight ratio of 94:6 (Comparative Example 11), 82:18 (Comparative Example 12) and 76:24 (Comparative Example 13). THe mixture was formed into an unstretched mixed sheet having a thickness of 1.0 mm by an extruder. The mixed sheet was stretched at 130° C. in the machine and cross directions at a stretch ratio of 3 by a biaxial stretching device to obtain a biaxially stretched polymer blend sheet containing the styrene/butadiene block copolymer resin in the same amount as in each of the biaxially stretched composite styrene resin sheets of Examples 11 to 13.

The tear strengths and tensile moduli of the biaxially stretched polymer blend sheets of Comparative Examples 11 to 13 were measured, and the results are shown in Table 9.

TABLE 9

| Comparative Example | Direction | Tear strength (g) | Tensile modulus ($\times 10^4$ kg/cm$^2$) |
|---|---|---|---|
| 11 | MD | 10.2 | 2.62 |
|    | CD | 15.1 | 2.59 |
| 12 | MD | 8.3 | 2.35 |
|    | CD | 17.3 | 2.33 |
| 3  | MD | 11.2 | 2.24 |
|    | CD | 21.6 | 2.21 |

EXAMPLES 14–16

Polystyrene (DIC STYRENE CR-5600) and styrene/butadiene block copolymer resin (K RESIN KR-05) were mixed by a tumbler in a weight ratio of 80:20 (Example 14), 40:60 (Example 15) and 20:80 (Comparative Example 16). Using the resulting mixtures and polystyrene (DIC STYRENE CR-5600), unstretched co-extruded multilayer sheets having a thickness of 1.0 mm composed of a styrene resin mixture/polystyrene/styrene resin mixture/polystyrene/styrene resin mixture/polystyrene/styrene resin mixture and a layer thickness ratio of 5/26.7/5/26.7/5/26.7/5 were prepared by using two extruders having a screw diameter of 50 mm and equipped with a full-flight type screw, a feed block and a coat hanger die. The multilayer sheets were then each stretched at 130° C. in the machine and cross directions at a stretch ratio of 3 by means of a biaxial stretching device to obtain 110 micron-thick biaxially stretched composite styrene resin sheets. In the stretched sheets, each of the styrene resin mixture layers had a thickness of 6 microns, and each of the polystyrene layers had a thickness of 29 microns.

The tear strengths and tensile moduli of the three biaxially stretched composite styrene resin sheets in Examples 14 to 16 were measured, and the results are shown in Table 10.

TABLE 10

| Example | Direction | Tear strength (g) | Tensile modulus ($\times 10^4$ kg/cm$^2$) |
|---|---|---|---|
| 14 | MD | 45.0 | 2.68 |
|    | CD | 48.0 | 2.67 |
| 15 | MD | 50.0 | 2.59 |
|    | CD | 57.0 | 2.58 |
| 16 | MD | 56.0 | 2.53 |
|    | CD | 59.0 | 2.51 |

COMPARATIVE EXAMPLES 14–16

Polystyrene (DIC STYRENE CR-5600) and styrene/butadiene block copolymer resin (K RESIN KR-05) were mixed in a weight ratio of 96:4 (Comparative Example 14), 88:12 (Comparative Example 15) and 84:16 (Comparative Example 16). The mixture was formed into an unstretched mixed sheet having a thickness of 1.0 mm by an extruder. The mixed sheet was stretched at 130° C. in the machine and cross directions at a stretch ratio of 3 by a biaxial stretching device to obtain a biaxially stretched polymer blend sheet containing the styrene/butadiene block copolymer resin in the same amount as in each of the biaxially stretched composite styrene resin sheets of Examples 14 to 16.

The tear strengths and tensile moduli of the biaxially stretched polymer blend sheets of Comparative Examples 14 to 16 were measured, and the results are shown in Table 11.

TABLE 11

| Comparative Example | Direction | Tear strength (g) | Tensile modulus ($\times 10^4$ kg/cm$^2$) |
|---|---|---|---|
| 14 | MD | 12.0 | 2.65 |
|    | CD | 15.0 | 2.63 |
| 15 | MD | 7.3 | 2.54 |
|    | CD | 17.0 | 2.51 |
| 16 | MD | 7.0 | 2.41 |
|    | CD | 15.3 | 2.39 |

EXAMPLES 17–19

Unstretched co-extruded multilayer sheets (1.0 mm thick) composed of a styrene resin mixture/polystyrene/styrene resin mixture/polystyrene/styrene resin mixture/polystyrene/styrene resin mixture and having a layer thickness ratio of 2.5/30/2.5/30/2.5/30/2.5. (Example 17), 7.5/23.3/7.5/23.3/7.5/23.3/7.5 (Example 18), and 10/20/10/20/10/20/10 (Example 19) were prepared from a mixture of 40 parts by weight of polystyrene (DIC STYRENE CR-5600) and 60 parts by weight of stryrene/butadiene blocked copolymer resin (K RESIN KR-05) and polystyrene (DIC STYRENE CR-5600). Then, the sheets were each stretched at 130° C. in the machine and cross directions at a stretch ratio of 3 to obtain biaxially stretched composite styrene resin sheets.

The tear strengths and tensile modulus of these stretched sheets were measured, and the results are shown in Table 12.

TABLE 12

| Example | Direction | Tear strength (g) | Tensile modulus ($\times 10^4$ kg/cm$^2$) |
|---|---|---|---|
| 17 | MD | 48.0 | 2.67 |
|    | CD | 52.0 | 2.66 |
| 18 | MD | 52.0 | 2.46 |
|    | CD | 61.0 | 2.43 |
| 19 | MD | 55.5 | 2.36 |
|    | CD | 64.0 | 2.33 |

COMPARATIVE EXAMPLES 17–19

Polystyrene (DIC STYRENE CR-5600) and styrene/butadiene block copolymer resin (K RESIN KR-05) were mixed in a weight ratio of 94:6 (Comparative Example 17), 82:18 (Comparative Example 18) and 76:24 (Comparative Example 19). The mixture was formed into an unstretched mixed sheet having a thickness of 1.0 mm by an extruder. The mixed sheet was stretched at 130° C. in the machine and cross directions at a stretch ratio of 3 by a biaxial stretching device to obtain a biaxially stretched polymer blend sheet containing the styrene/butadiene block copolymer resin in the same amount as in each of the biaxially stretched composite styrene resin sheets of Examples 17 to 19.

The tear strengths and tensile moduli of the biaxially stretched polymer blend sheets of Comparative Examples 17 to 19 were measured, and the results are shown in Table 13.

TABLE 13

| Comparative Example | Direction | Tear strength (g) | Tensile modulus ($\times 10^4$ kg/cm$^2$) |
|---|---|---|---|
| 17 | MD | 10.2 | 2.62 |
|    | CD | 15.1 | 2.59 |
| 18 | MD | 8.3 | 2.35 |
|    | CD | 17.3 | 2.33 |
| 19 | MD | 11.2 | 2.24 |
|    | CD | 21.6 | 2.21 |

What we claim is:

1. A biaxially stretched composite styrene resin sheet of a multilayer structure, comprising at least one layer of polystyrene and at least two layers of a mixture of polystyrene and styrene/butadiene block copolymer resin, wherein both outside layers are formed of said mixture, the thickness of each of the outside layers is 1 to 20% of the total thickness of said sheet, and the entire sheet is biaxially stretched.

2. A biaxially stretched composite styrene resin sheet of a three-layer structure comprising a central layer of polystyrene and outside layers of a mixture of polystyrene and styrene/butadiene block copolymer resin formed on both surfaces of the central layer, wherein the thickness of each of the outside layers is 1 to 20% of the total thickness of said sheet, and the entire sheet is biaxially stretched.

3. A biaxially stretched composite styrene resin sheet of a five-layer structure comprising a central layer, intermediate layers on both surfaces of the central layer, and outside layers formed outwardly of the intermediate layers, wherein the intermediate layers are formed of polystyrene and the central layer and the outside surface layers are formed of a mixture of polystyrene and styrene/butadiene block copolymer resin, the thickness of each of the outside surface layers is 1 to 20% of the total thickness of said sheet, and the entire sheet is biaxially stretched.

4. A biaxially stretched composite styrene resin sheet of a seven-layer structure comprising a central layer, first intermediate layers on both surfaces of the central layer, second intermediate layers outwardly of the first intermediate layers, and outside layers formed outwardly of the second intermediate layers, wherein the central layer and the second intermediate layers are formed of polystyrene, the first intermediate layers and the outside surface layers are formed of a mixture of polystyrene and styrene/butadiene block copolymer resin, the thickness of each of the outside surface layers is 1 to 20% of the total thickness of said sheet, and the entire sheet is biaxially stretched.

5. The biaxially stretched composite styrene resin sheet according to any one of claims 1 to 4 wherein the mixing ratio of polystyrene to styrene/butadiene block copolymer resin in said mixture is from 95:5 to 20:80 by weight.

6. The biaxially stretched composite styrene resin sheet according to any one of claims 1 to 4 wherein the styrene/butadiene block copolymer resin in said mixture has a styrene content of from 20 to 90% by weight and a butadiene content of from 80 to 10% by weight, and a melt flow index of 3 to 12 g/10 min.

7. The biaxially stretched composite styrene resin sheet according to any one of claims 1 to 4 wherein the biaxially stretched sheet has a thickness of from 0.1 to 1.0 millimeter.

8. A biaxially stretched composite styrene resin sheet of any one of claims 1 to 4 wherein the mixture of polystyrene and styrene/butadiene block copolymer resin comprises recycled skeleton obtained as waste from previously molded articles of said biaxially stretched composite styrene resin sheet.

9. A molded article formed from the biaxially stretched composite styrene resin sheet of any one of claims 1 to 4.

* * * * *